United States Patent
Rusan et al.

(10) Patent No.: US 8,148,848 B2
(45) Date of Patent: *Apr. 3, 2012

(54) SOLID STATE POWER CONTROLLER (SSPC) USED AS BUS TIE BREAKER IN ELECTRICAL POWER DISTRIBUTION SYSTEMS

(75) Inventors: Ileana Rusan, Toronto (CA); David Lazarovich, Thornhill (CA); Zhenning Liu, Mississauga (CA); Srinivasa Rao Dangeti, Razole (IN); Subodh Keshri, Mississauga (CA); Gopi Gudimetla, Mississauga (CA); Randy J. Fuller, Hillsburgh (CA); Edwin Yue, Unionville (CA)

(73) Assignee: Honeywell International, Inc., Morristown, NJ (US)

( * ) Notice: Subject to any disclaimer, the term of this patent is extended or adjusted under 35 U.S.C. 154(b) by 736 days.

This patent is subject to a terminal disclaimer.

(21) Appl. No.: 12/202,137

(22) Filed: Aug. 29, 2008

(65) Prior Publication Data

US 2009/0189455 A1 Jul. 30, 2009

Related U.S. Application Data

(63) Continuation-in-part of application No. 12/019,474, filed on Jan. 24, 2008, now Pat. No. 7,626,798.

(51) Int. Cl.
*H02J 3/06* (2006.01)

(52) U.S. Cl. .......................................................... 307/82
(58) Field of Classification Search ..................... 361/62, 361/93.6; 307/82
See application file for complete search history.

(56) References Cited

U.S. PATENT DOCUMENTS

| | | | |
|---|---|---|---|
| 4,380,725 A | | 4/1983 | Sherman |
| 5,764,502 A | * | 6/1998 | Morgan et al. .................. 363/65 |
| 7,177,125 B2 | | 2/2007 | Lazarovich et al. |
| 7,626,798 B2 | * | 12/2009 | Rusan et al. .................. 361/93.6 |
| 2006/0071559 A1 | * | 4/2006 | Hanson et al. .................. 307/43 |

FOREIGN PATENT DOCUMENTS

WO WO 98/34318 8/1998

* cited by examiner

*Primary Examiner* — Rexford N Barnie
*Assistant Examiner* — Angela Brooks
(74) *Attorney, Agent, or Firm* — Michael A. Shimokaji

(57) ABSTRACT

The present invention provides an electrical power distribution system that includes a first primary distribution panel (PDP) connected to a first source of electrical power and a second PDP connected to a second source of electrical power. The second PDP is connected to the first PDP by a conductor. A first solid state power controller (SSPC) receives signals corresponding to the flow of current through the first PDP to a load. A second SSPC receives signals corresponding to the flow of current between the first PDP and the second PDP. The first and second SSPC protect the electrical power distribution system from a variety of fault conditions.

15 Claims, 3 Drawing Sheets

SOLID STATE POWER CONTROLLER (SSPC) USED AS BUS TIE BREAKER IN ELECTRICAL POWER DISTRIBUTION SYSTEMS

The present application is a continuation-in-part application of U.S. patent application Ser. No. 12/019,474 filed on Jan. 24, 2008, currently pending.

BACKGROUND OF THE INVENTION

The present invention relates to electrical power distribution systems, and more particularly, to the control of bus tie breakers in electrical power distribution systems.

Conventional electrical power systems architecture, such as those used in aerospace applications, usually needs to be reconfigured in the event of a power source failure or interconnect cabling failures. In electrical power systems having multiple power sources, when one power source fails, power may be transferred to the distribution bus of the failed power source from another power source. Bus Tie Contactors (BTCs) are typically used to accomplish this transfer of power between busses fed by different sources of electrical power.

FIG. 1 shows a conventional electrical power distribution system 10 in accordance with the prior art. FIG. 1 shows the electrical power system 10 during normal mode of operation. Two electrical power sources 12, 14 are connected to electrical loads 16, 18 via distribution buses 24 and 26 located in power distribution panels 20, 22 respectively. The power sources 12, 14 may be, for example, electrical generators. Power bus bars 24, 26 connect the electrical power sources to the plurality of electrical loads 16, 18 through a plurality of Electrical Load Control Units, e.g., (ELCUs) 28, 30. The ELCUs 28, 30 as well as circuit breakers (not shown) may be used to provide line protection for each load 16, 18.

In the electrical power distribution system 10 bus tie contactors (BTCs) 32, 34 are used to allow transfer of, or to isolate electrical power between, power bus bars 24, 26. The transfer may be performed by connecting ("tying") electrical power buses together through electrical connection 36, which may comprise a cable. The BTCs 32, 34 may be used to reconfigure the system under certain fault conditions to ensure the availability of power on both buses 24 and 26.

Electrical power system 10 may be a variable frequency or a constant frequency power system. In a variable frequency power system, the power sources 12, 14 are not synchronized and power buses cannot be tied together. During normal operation, as shown in FIG. 1, each power source 12, 14 delivers power to its own bus 24, 26 and the BTCs 32, 34 are de-activated (opened) to keep the generator channels separated. BTCs 32, 34 may be controlled by control logic in a bus power control unit (BPCU) hereinafter referred to as a CONTROL DEVICE 46, which senses current from current transformers (CTs) 48, 50.

FIG. 2 shows the state of the electrical power system 10 when the electrical source 12 has failed. Generator control units (GCUs) 38, 40 may be used to detect the failure of either the electrical source 12 or 14 respectively. Upon failure of electrical source 12, the associated GCU 38 will isolate the electrical source 12 by commanding a generator control breaker (GCB) 42 to open, thereby removing the power source 12 from the bus bar 24.

To ensure availability of power to the loads 16, connected to the "dead bus", the BTCs will be activated (closed) by signals from the CONTROL DEVICE 46, or by GCUs 38 and 40, as shown in FIG. 2. In this way, the unpowered bus bar 24 will be cross-fed by the active power source 14 which may supply the total power to both power bus bars 24, 26.

Likewise, in the case of a failure of power source 14, the associated GCU 40 may sense the failure and may command GCB 44 to open and thereby removing the power source 14 from the bus bar 26. CONTROL DEVICE 46 would also close both BTCs 32, 34 so that power source 12 may supply power to both power bus bars 24, 26.

FIG. 3 shows the electrical power system 10 in the situation where there has been a subsequent power bus fault. In particular, as shown in FIG. 3, power bus bar 24 has failed short-circuited; this led to the disconnection of power source 12 from the bus by its GCU. The BTCs 32, 34 may once again be de-activated (opened) to isolate the fault. Power bus bar 24 may be de-energized. The power to all loads 16 supplied by power bus bar 24 will be lost.

Some present aerospace applications have the control logic of the BTCs 32, 34 implemented in the GCUs 38, 40, while most applications have the logic implemented in the CONTROL DEVICE 46.

There are a number of disadvantages with the BTC control of electrical power system 10 shown in FIGS. 1-3. The control of the BTCs 32, 34 is relatively complex to insure safe power handling and transfer.

In more detail, there are two different cases which require these control algorithms.

Case 1: each power source feeds its own bus, where three control algorithms are needed as follows:
  a) control algorithm for the detection of the transfer condition/request;
  b) analysis algorithm for the isolation of the cause of failure; if the generator disconnect was due to an over current fault, the closure of the BTC needs to be inhibited since this points to a bus failure that could propagate to generator 2; and
  c) protection algorithm (differential fault protection—DP) to inhibit the closure of the BTC in the case a fault to ground is detected on the cable connecting between bus bar 1 and bus bar 2.

Case 2: One generator feeds both busses, where two control algorithms are needed as follows:
  a) control algorithm to isolate an over current fault to the specific bus; this algorithm usually involves the opening of the BTC, monitoring the over current by the GCU; with the assumption that generator 2 feeds both bus bars, if the over current disappears after the opening of the BTC, it means that the fault is on bus bar 1, therefore the BTC connection must be disabled, if the over current persists, generator 2 must be disconnected from the bus; and
  b) protection algorithm (differential fault protection—DP) to open the BTC in the case of a fault to ground is detected on the cable connecting between bus bar 1 and bus bar 2.

The implementation of the above algorithms requires use of current measurement devices, i.e. current transformers (CT), optimization for the allocation and coordination of control between GCU and CONTROL DEVICE.

The electric power system 10 shown in FIGS. 1-3 is a relatively simple example since it addresses a system including only two generating source. In practice, the electrical power system may be more complex, including multiple generators and external power sources. The principle of control remains the same; however, the control algorithms become even more complex.

As can be seen, there is a need for a simple and efficient way to handle the failure of a power source in electric power systems having multiple power sources. There is also a need for a simple and efficient way to control bus tie contactors during various failure conditions in electrical power systems.

SUMMARY OF THE INVENTION

In one aspect of the present invention, an AC electrical power distribution system comprises a first primary distribution panel (PDP) connected to a first source of electrical power; a second PDP connected to a second source of electrical power, the second PDP being connected to the first PDP by a cross-tie conductor; a first solid state power controller (SSPC) receiving signals corresponding to the flow of current through the first PDP; a second SSPC receiving signals corresponding to the flow of current through the second PDP; a data communication bus between the first and second PDPs housing the first and second SSPCs and communicating current information through both the first and second SSPCs; and the first and second SSPCs responding to a fault condition in the conductor by interrupting the flow of electrical power between the first and second PDPs.

In another aspect of the present invention, an electrical power distribution system comprises a first source of electrical power connected to a first primary distribution panel (PDP); a second source of electrical power connected to a second PDP; an electrical load; a first solid state power controller (SSPC) to said first source of electrical power; a second SSPC connected to said second source of electrical power; and a cross-tie conductor connected between the first PDP and the second PDP.

In accordance with a further aspect of the present invention, a circuit for protecting an electrical power distribution system comprises a first power distribution panel (PDP) connected to a first bus bar, the first bus bar connected to a first source of electrical power; a second PDP connected to a second bus bar, the second bus bar connected to a second source of electrical power; a cross-tie conductor connection the second PDP to the first PDP; a first solid state power controller (SSPC) receiving signals corresponding to a flow of current in the cross-tie conductor through the first PDP, the first SSPC receiving current information corresponding to a flow of current in the second PDP via a communication data bus; a second SSPC receiving signals corresponding to the flow of current in the cross-tie conductor through the second PDP, the second SSPC receiving current information corresponding to the flow of current in the first PDP via the communication bus; wherein the first SSPC and the second SSPC responds to a fault condition in the cross-tie conductor by interrupting the flow of electrical power between the first PDP and the second PDP.

These and other features, aspects and advantages of the present invention will become better understood with reference to the following drawings, description and claims.

DETAILED DESCRIPTION OF THE INVENTION

Figure 1:
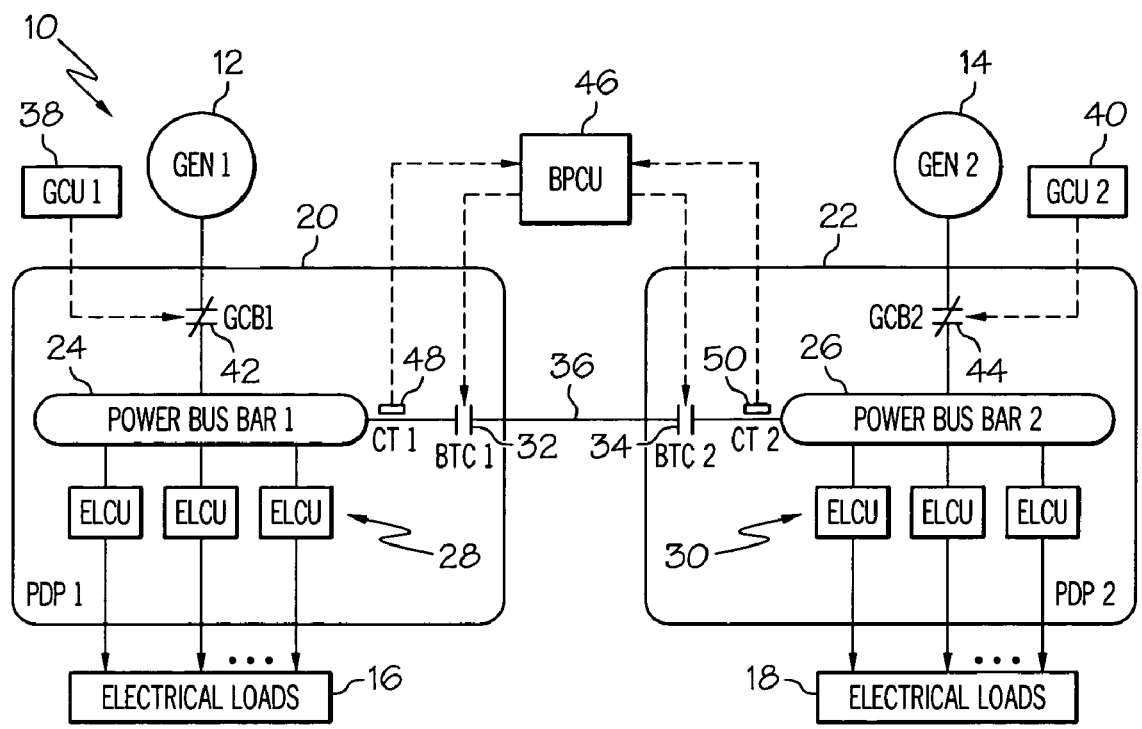
FIG. 1 is a block diagram of an electric power system in accordance with the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be advantageously used in electric power systems, including aerospace electrical primary distribution panels (PDP). Embodiments of the present invention may provide for the protection between PDP busses that may have lost their dedicated source of power. Embodiments of the present invention may use a high power SSPC in place of a Bus Tie Contactor (BTC) commanded contactor. Prior art electric power systems relied on BTCs for this protection function.

The present invention includes the use of high power SSPCs to replace the classic implementation of Bus Tie Contactor functionality in AC electrical power systems. Using high power SSPCs in place of the contactors ensures significant simplification of the circuitry including elimination of externally connected current sensing devices, wiring, connectors and protection algorithms housed in separate LRUs, i.e., GCUs or Control Devices as mentioned in the above background. As discussed below, the elimination of the external current measurement devices is based on the use by the SSPC of its internal current information from own current sensor as well as information on the 'end of line' current form the 'paired' SSPC via a data bus that connects the controls of the two PDPs.

The following fault conditions in the tie conductors may be detected and isolated by the two SSPCs of the present invention operating in tandem:
differential fault—the current measured by BTC1 (see FIGS. 1-3)_is different than the current measured by BTC2 (see FIGS. 1-3) by a certain threshold amount;
overcurrent fault—the current through the conductor(s) as measured by any one of the BTCs is above a certain threshold amount; and
current unbalance—the current in different phases of the tie conductors differ in excess of a certain threshold amount.

Embodiments of the present invention may replace the BTC control algorithms located in the Control Device or GCU with the protection algorithms located as standard features in the SSPC enhanced with differential protection and current unbalance algorithms. The differential protection algorithm may require current information from both ends of the tie conductor. Each side of the SSPC may incorporate one current sensor measuring the load current at each side. The end side current in the cross tie connection may be measured by the second SSPC. In most applications, the SSPCs may be connected either individually or via a separate electronic communication card to a data communication bus. Via the data bus, the second SSPC may be supplied with the current information of its corresponding pair in the BTC application.

The use of SSPCs in this fashion for the implementation of the classic Bus Tie Contactor function may eliminate substantial wiring between primary distribution panels (PDPs), control device connectors, and current sensors. The SSPCs of the present invention may also help control scheme complexity. Embodiments of the present invention may also supplement the differential protraction in classic ELCUs with overcurrent protection due to the availability of the algorithm in the SSPC. Prior art systems used a control device housing the differential protection algorithm of the BTC application.

Figure 4:
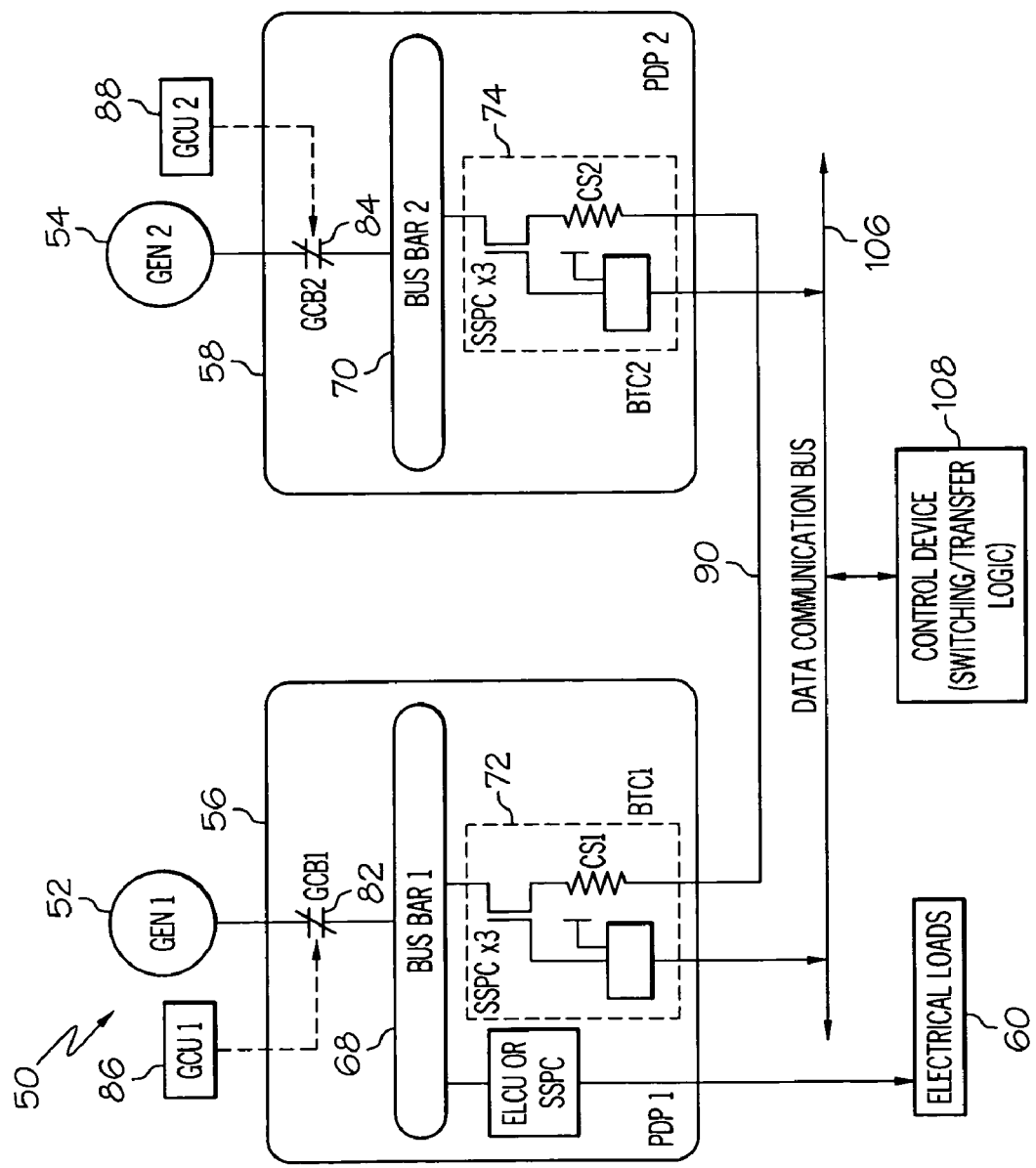
FIG. 4 is a block diagram of an electric power system in accordance with one embodiment of the present invention.

FIG. 4 shows a block diagram of an electric power system 50 which insures the distribution and protection of outgoing power to system loads. The electric power system 50 includes first and second power sources 52, 54, which may comprise electrical generators. Each power source 52, 54 may supply electric power to a primary distribution panel (PDP) 56, 58, which in turn may supply electric power to one or more loads 60. In the case of a failure of one of the power sources 52, 54, the assigned bus 68, 70 may be cross-fed from failed source via cross-tied SSPCs 72, 74. Generator control breakers (GCB) 82, 84 may be closed to allow power to flow from the power sources 52, 54 to their respective bus bars 68, 70. The generator control breakers 82, 84 may be controlled by their respective generator control units 86, 88 in a manner known in the art.

SSPCs commonly are provided with built-in "intelligence" features such as:
 Overload current protection based on an inverse over-current and time function;
 Programmability for over-current protection; and
 Responsive to external command to close the power circuit to allow for remote switching control.

Additional algorithms for implementation of the cross-tie cable protection (failure of the cross-tie cable 90 between the PDPs 56, 58) may be embedded in the control device of the SSPC. These algorithms may include such algorithms for the following:
 Differential current protection via measurement of the load current on both ends of the cross-tie connection 90;
 Phase imbalance protection trip when one of the phase current becomes higher or lower than the rest by a predetermined amount; and
 Output signal for load current monitoring by hardwire or by data bus.

Electric power system 50 may include first and second high power SSPCs 72 and 74 connected to a control device 108. Device 108 may be a CONTROL DEVICE or GCU for the purpose of the control of the status (ON/OFF) of the SSPC, i.e., detection of system operational conditions that may require the closure of the two SSPCs 72,74. First SSPC 72 may be located in PDP 20 and may close or open the cross tie circuit through data bus control as commanded by the control device 108. SSPC 72 may be coupled to the bus bar 68 (such as L BUS 230 VAC) and receive line current information through Current Sensor CS1 which is integral part of the SSPC 72.

Second SSPC 74 may be located in PDP 22 and may close or open the cross tie circuit through data bus control. SSPC 74 may be coupled to the bus bar 70 (such as R BUS 230 VAC) and receive line current information through Current Sensor CS2 which is integral part of the SSPC 74.

Both high power SSPCs 72, 74 transmit the sensed current information over the data bus 106. In this way, both SSPCs 72, 74 may have access to the current measurement at both ends of the tie conductor 90.

Figure 2:
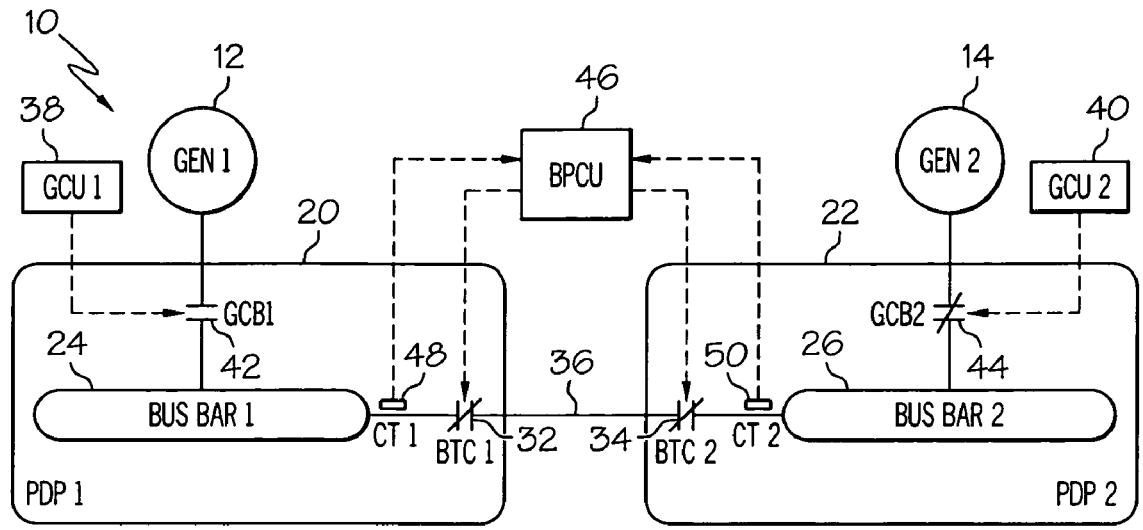
FIG. 2 is a block diagram of the electric power system shown in FIG. 1 in a first failure mode.
Figure 3:
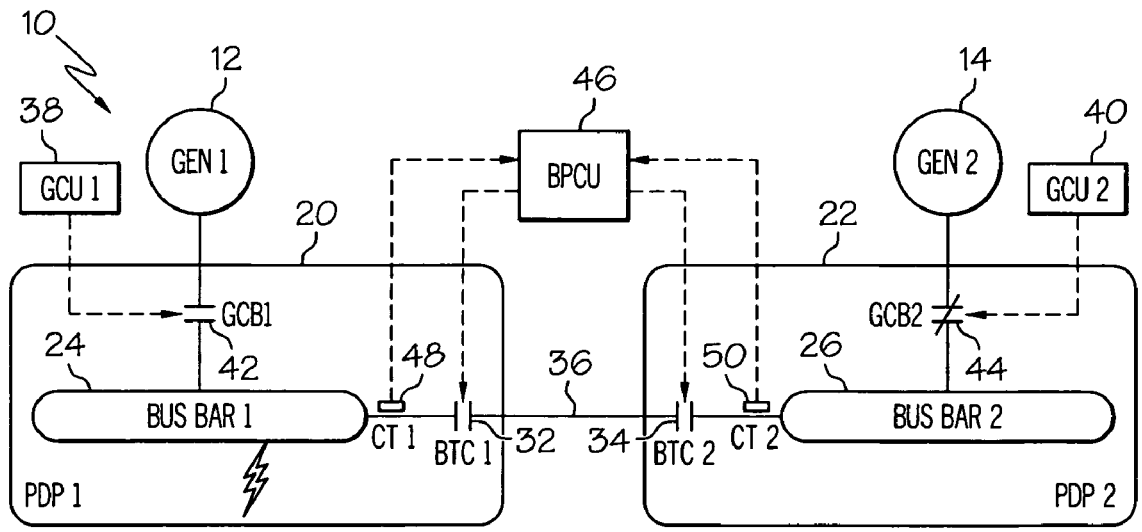
FIG. 3 is a block diagram of the electric power system shown in FIG. 1 in a second failure mode.

The operation of first and second SSPC 72, 74 and control device 108 may be similar to the operation of the CONTROL DEVICE 46 and BTCs 32, 34 as shown in FIGS. 1-3. In particular, in a normal mode, first and second SSPCs 72, 74 are open. In this state the two PDPs 56, 58 may operate independently. In a failure mode, where power source 52 fails, control device 108 may sense this condition and close SSPCs 72, 74. In this way, power from source 54 may directed across to PDP 52 where it can supply electrical power to the load 60.

SSPCs 72, 74 along with the control device 108 may be provided with the following algorithms as standard features: algorithm (a) for differential protection to protect against faults to ground; algorithm (b) for over-current protection, and algorithm (c) for missing phase protection. By the use of the standard algorithms in SSPCs the control of the electric power system is simplified as compared to the prior art. In particular, algorithm (a) may replace the prior art protection algorithm that inhibits the closure of the BTC in the case where a fault to ground is detected on the feeder cross tie 90. Algorithm (b) may replace the prior art analysis algorithm for the isolation of the cause of the failure described above, as well as the prior art control algorithm used to isolate an over current fault to the specific bus in cases where one power source feeds both busses. Algorithm (c) may enhance the protection capabilities of the control due to the fact that it does not permit operation of the loads connected to a power bus bar with a missing phase.

Thus, it may be seen that the present invention may provide a solution for the implementation of the bus bar connections via the use of high power SSPCs with integral control instead of classic contactors with control allocated to GCUs or CONTROL DEVICE. Also, the present invention may take full advantage of the features already built in as part of the SSPC design to simplify the architectures for an aircraft electric power system, and to implicitly optimize the control logic during normal and abnormal modes of operation. The use of a common device, the high power SSPC in place of a BTC, may allow the achievement of a modular design. As such, a single device, the SSPC, can be used to protect all output feeders from a PDP; both the supply feeders and the bus cross tie feeders. The present invention can allow a modular implementation of power distribution panel by using common devices for both, power distribution and cross tie connections. The present invention also can allow for the simplification of control algorithms located in GCUs and CONTROL DEVICEs including the downgrading of the redundancy levels required for implementation of this hazardous functionality. The present invention can enhance the electrical power system protections by adding the missing phase protection of a bus bar.

It should be understood, of course, that the foregoing relates to exemplary embodiments of the invention and that modifications may be made without departing from the spirit and scope of the invention as set forth in the following claims.

We claim:

1. An AC electrical power distribution system comprising:
 a first primary distribution panel (PDP) connected to a first source of electrical power;
 a second PDP connected to a second source of electrical power, said second PDP being connected to said first PDP by a cross-tie conductor;
 a first solid state power controller (SSPC) receiving signals corresponding to a first flow of current through said first PDP;
 a second SSPC receiving signals corresponding to a second flow of current through said second PDP;
 a data communication bus between the first and second PDPs housing the first and second SSPCs and communicating current information through both the first and second SSPCs; and
 said first and second SSPCs responding to a fault condition in said conductor by interrupting a third flow of electrical power between said first and second PDPs,
 wherein the first SSPC and the second SSPC both include an algorithm that implements protection against faults to ground.

2. The electrical power distribution system of claim 1 further comprising:
 a first current sensor sending signals corresponding to said first flow of current from said first source through said first PDP; and a second current sensor sending signals corresponding to said second flow of current from said second source through said second PDP.

3. The electrical power distribution system of claim 2 wherein said second current sensor sends signals corresponding to the flow of current from said second source to said first SSPC.

4. The electrical power distribution system of claim 2 wherein said first current sensor sends signals corresponding to the flow of current from said first source to said second SSPC.

5. The electrical power distribution system of claim 2 wherein said first and second current sensors are current transformers.

6. The electrical power distribution system of claim 1 wherein said first and second sources of electrical power are sources of variable frequency electrical power.

7. The electrical power distribution system of claim 1 wherein said first and second sources of electrical power are sources of constant frequency electrical power.

8. An electrical power distribution system comprising:
   a first source of electrical power connected to a first primary distribution panel (PDP);
   a second source of electrical power connected to a second PDP;
   an electrical load;
   a first solid state power controller (SSPC) to said first source of electrical power;
   a second SSPC connected to said second source of electrical power; and
   a cross-tie conductor connected between the first PDP and the second PDP,
   wherein the first SSPC and the second SSPC both include an algorithm that implements over-current protection.

9. The electrical power distribution system of claim 8 wherein the first SSPC sensing a fault condition in the cross-tie conductor and in response thereto, interrupting flow of electrical power between the first PDP and the second PDP.

10. The electrical power distribution system of claim 8, further comprising a current sensor connected to said first SSPC.

11. The electrical power distribution system of claim 9 further comprising:
   a first power bus bar connected to said first source of electrical power and to said first PDP; and
   a second power bus bar connected to said second source of electrical power and to said second PDP.

12. A circuit for protecting an electrical power distribution system comprising:
   a first power distribution panel (PDP) connected to a first bus bar, the first bus bar connected to a first source of electrical power;
   a second PDP connected to a second bus bar, the second bus bar connected to a second source of electrical power;
   a cross-tie conductor connection the second PDP to the first PDP;
   a first solid state power controller (SSPC) receiving signals corresponding to a flow of current in the cross-tie conductor through the first PDP, the first SSPC receiving current information corresponding to a flow of current in the second PDP via a communication data bus;
   a second SSPC receiving signals corresponding to the flow of current in the cross-tie conductor through the second PDP, the second SSPC receiving current information corresponding to the flow of current in the first PDP via the communication bus;
   wherein the first SSPC and the second SSPC responds to a fault condition in the cross-tie conductor by interrupting the flow of electrical power between the first PDP and the second PDP,
   wherein the first SSPC and the second SSPC both include an algorithm that implements missing phase protection.

13. The circuit of claim 12 wherein the first SSPC internally receives signals corresponding to the flow of current in the cross-tie conductor through the first PDP.

14. The circuit of claim 12 wherein the second SSPC internally receives signals corresponding to the flow of current in the cross-tie conductor through the second PDP.

15. The circuit of claim 12 further comprising a control device connected to and controlling said first SSPC and said second SSPC.

* * * * *